Feb. 14, 1967 W. G. STEWART ETAL 3,303,807

HELICOPTER RAPID SECURING DEVICE

Filed Oct. 16, 1964 22 Sheets-Sheet 1

Feb. 14, 1967 W. G. STEWART ETAL 3,303,807

HELICOPTER RAPID SECURING DEVICE

Filed Oct. 16, 1964 22 Sheets-Sheet 3

Feb. 14, 1967 W. G. STEWART ETAL 3,303,807

HELICOPTER RAPID SECURING DEVICE

Filed Oct. 16, 1964 22 Sheets-Sheet 5

Feb. 14, 1967 W. G. STEWART ET AL 3,303,807

HELICOPTER RAPID SECURING DEVICE

Filed Oct. 16, 1964 22 Sheets-Sheet 7

Feb. 14, 1967 W. G. STEWART ETAL 3,303,807

HELICOPTER RAPID SECURING DEVICE

Filed Oct. 16, 1964 22 Sheets-Sheet 8

Feb. 14, 1967 W. G. STEWART ETAL 3,303,807

HELICOPTER RAPID SECURING DEVICE

Filed Oct. 16, 1964 22 Sheets-Sheet 9

Feb. 14, 1967 W. G. STEWART ETAL 3,303,807

HELICOPTER RAPID SECURING DEVICE

Filed Oct. 16, 1964 22 Sheets-Sheet 12

HELICOPTER RAPID SECURING DEVICE

Feb. 14, 1967 W. G. STEWART ETAL 3,303,807

HELICOPTER RAPID SECURING DEVICE

Filed Oct. 16, 1964 22 Sheets-Sheet 16

Feb. 14, 1967 W. G. STEWART ETAL 3,303,807

HELICOPTER RAPID SECURING DEVICE

Filed Oct. 16, 1964 22 Sheets-Sheet 18

Feb. 14, 1967 W. G. STEWART ETAL 3,303,807

HELICOPTER RAPID SECURING DEVICE

Filed Oct. 16, 1964 22 Sheets-Sheet 19

3,303,807

HELICOPTER RAPID SECURING DEVICE

William Gordon Stewart, Halifax, Nova Scotia, and Asbjorn Baekken, Dartmouth, Nova Scotia, Canada, assignors to Canadian Patents and Development, Limited, Ottawa, Ontario, Canada Filed Oct. 16, 1964, Ser. No. 404,374
Claims priority, application Canada, Oct. 18, 1963, 887,011
14 Claims. (Cl. 114—43.5)

This invention relates to landing and securing aircraft of the rotor-sustaining or hovering type on a platform. Securing an aircraft such as a helicopter on the deck of a moving ship presents several formidable problems. Such problems are two-fold: (1) to land the helicopter in a very small area as quickly as possible and (2) to secure the helicopter to the deck as soon as possible after landing. It is also desirable to maneuver the helicopter to the ship's hangar while the helicopter remains secured to the deck.

Various attempts to solve these problems have met with varying degrees of success. The prior devices include a strut secured to aircraft of the rotor-sustaining type and incorporating movable parts adapted to penetrate and grasp a grill work landing platform, thereby securing the aircraft to the platform. Other devices include a cup mounted upon a movable carriage on a ship's deck for receiving a retractable mooring cone, the latter being secured to the underside of the airship. In this device, a cable and winch means secured to the carriage is used to draw the cone into the cup. A still further device employs a movable carriage retained by and moving upon a suitable track secured to a ship's deck. The carriage includes a retractable mooring plate adapted releasably to engage a projecting portion of an airship. The winch and cable means carried by the carriage is utilized to bring the ship into contact with the mooring plate. Other devices for this purpose include a housing formed on the underside of the aircraft fuselage and the winch and cable mounted on the craft and adapted to draw and retain an object into the housing.

A still further device includes a housing mounted in the airship and an anchor retractable into the housing suspended from a cable wound on a suitable winch and means for detachably retaining the anchor in the housing.

The present invention makes use of a constant tension winch in order to obtain high accuracy in the landing operation. Through the use of such a winch, safe landings can be made repeatedly within a circle three feet in diameter. This is desirable when the helicopter is to be landed on a transporting means, such as a carriage and hence the problem of straightening the helicopter is considerably simplified. In addition, the present invention enables the securing of the cable to the underside of the helicopter by means of a coupling of the type which automatically locks the cable to the aircraft and which is capable of being quickly disconnected by the pilot if trouble arises in the landing operation. Furthermore, the present invention provides a winch in the helicopter to which a light messenger cable is attached for the purpose of drawing the haul-down cable to the aircraft as the aircraft hovers above the deck of the ship.

It has been established that a constant tension winch and a single cable can satisfactorily draw the aircraft on to the deck. When the helicopter has landed, a main portion of the coupling is then secured to the carriage by a mechanism which is activated as soon as the aircraft is settled. Subsequent movement of the carriage along a rail provided in the deck towards the ship's hangar also causes the helicopter to be centered with respect to the carriage.

In the drawings which illustrate an embodiment of the invention:

Figure 1:
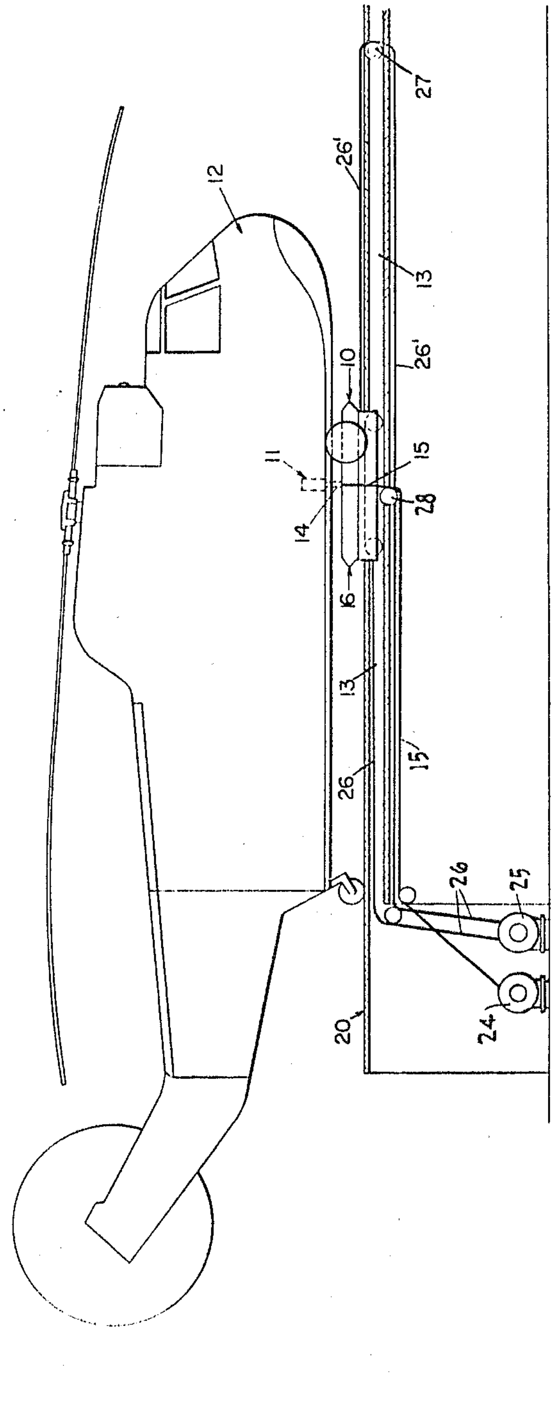
FIG. 1 is a side elevational view partly in section illustrating the landing and securing device of this invention in use on a helicopter including a housing, probe and transporting means secured to a ship's deck.

Referring now in detail to the drawings, a helicopter securing and transporting device is shown generally at 10 in FIG. 1.

The device 10 includes generally a housing 11 secured to the underside of a helicopter 12 adjacent its center of gravity. A rigid hollow cylindrical probe 14, is telescopically mounted within the housing 11. A haul-down cable 15 having an end fitting 15' (see FIG. 4) is adapted to be received in and secured to the housing 11.

A carriage 16, similar to that of a ship's catapult and adapted to travel along a trough 13 in a ship's deck 20, secures the helicopter 12 when it is landed.

Figure 2:
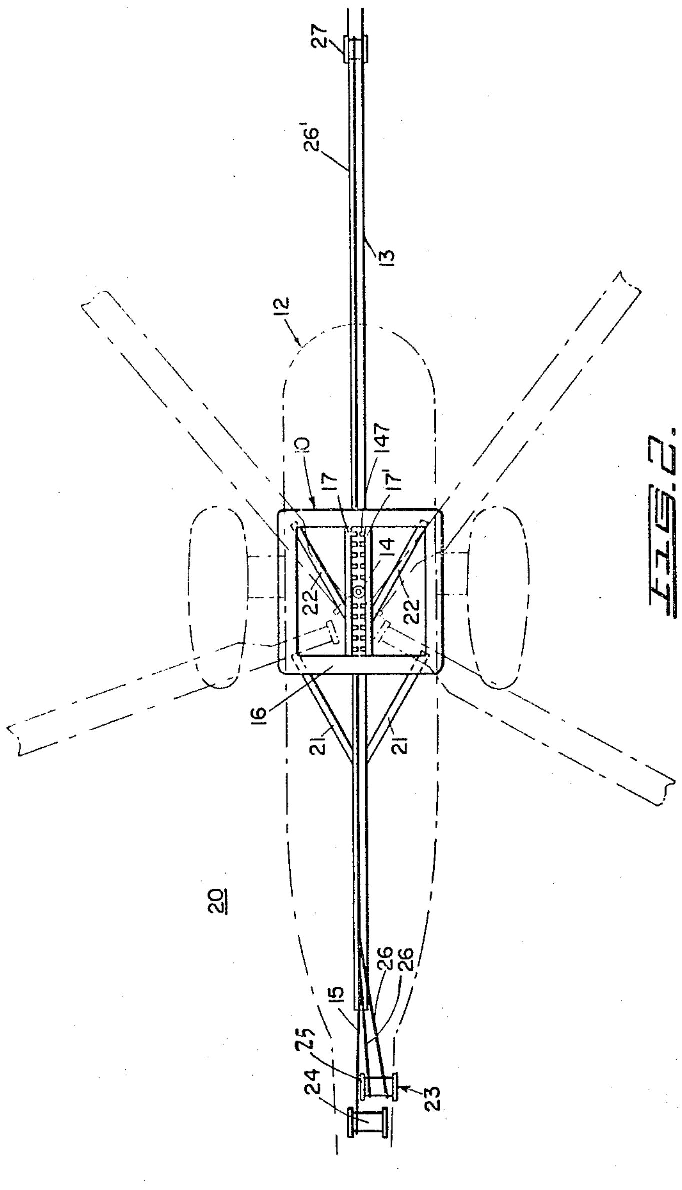
FIG. 2 is a top plan view of the deck and securing device of FIG. 1, showing the helicopter in phantom.

The probe 14 is adapted to be secured to the carriage 16 by means of arresting rails, as shown generally at 17 and 17′ in FIG. 2, which prevent lateral movement of the probe 14 and the helicopter 12. Fore and aft movement of the helicopter is prevented by spring loaded pins which will be described below with reference to FIG. 12.

Probe centering means for centering the probe transversely with respect to the carriage is provided, and includes pairs of centering rails 21 and 22 secured to the deck 20. The purpose of these centering rails will be described below.

A winch 23 having two drums 24, 25 is provided for use in both the landing or draw-down phase and for towing the carriage 16 along the deck 20. The haul-down cable 15 is secured to the drum 24 and passes over an idler pulley 28 in the trough 13.

A portion of a towing cable 26 is wound on drum 25 and one end thereof is secured to the aft end of carriage 16 for towing the carriage rearwardly. The other end of the cable 26 passes over idler pulley 27 in the ship's hangar (not shown) and is secured to the forward end of the carriage 16 for towing the carriage forward into the hangar.

*The carriage*

The carriage 16 as shown more clearly in FIGS. 3, 4, 5 and 6 comprises a main frame 120 constructed of four channel beams 121 suitably connected at their adjacent ends to form a square. A shuttle beam 122 positioned midway between two mutually opposed beams 121 of the frame 110 is secured at its ends to the frame 110 by bolts, welding or other conventional means. The shuttle beam 122 has a T-shaped cross section and is provided adjacent its ends with transverse brackets 111 to facilitate securing the shuttle beam to two transverse beams 112. The transverse beams 112 are secured at their ends to the channel beams 121 at the sides of the main frame 120. A fairlead 125 adapted to receive haul-down cable end fitting 15′ is inserted in a suitable aperture 126 at the midpoint of the shuttle beam 122. The haul-down cable 15 passes around the pulley 28 and up through the aperture 126 in the fairlead 125.

A pair of wheels 123 are rotatably mounted astride the shuttle beam 122 at each end thereof. The wheels 123 are adapted to support the carriage 16 and are guided by the trough 13 in the ship's deck 20. Four stabilizing nylon-covered rollers 124 adapted to roll on the deck 20 are secured to the underside of the main frame 120 adjacent each of the corners thereof.

Two pairs of side guide wheels 113 are mounted for rotation in a horizontal plane at opposing sides of the shuttle beam 122 adjacent the wheels 123 at each end thereof. The side guide wheels 113 are adapted to be in rolling contact with the vertical side walls of the trough 13 in the ship's deck.

Figure 5:
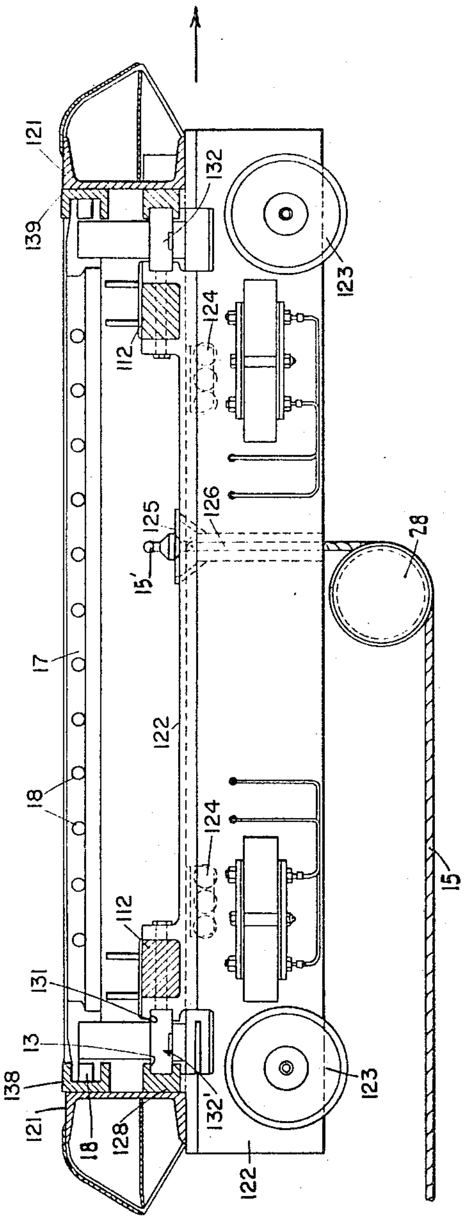
FIG. 5 is a sectional view taken along the line 5—5 of FIG. 3.
Figure 6:
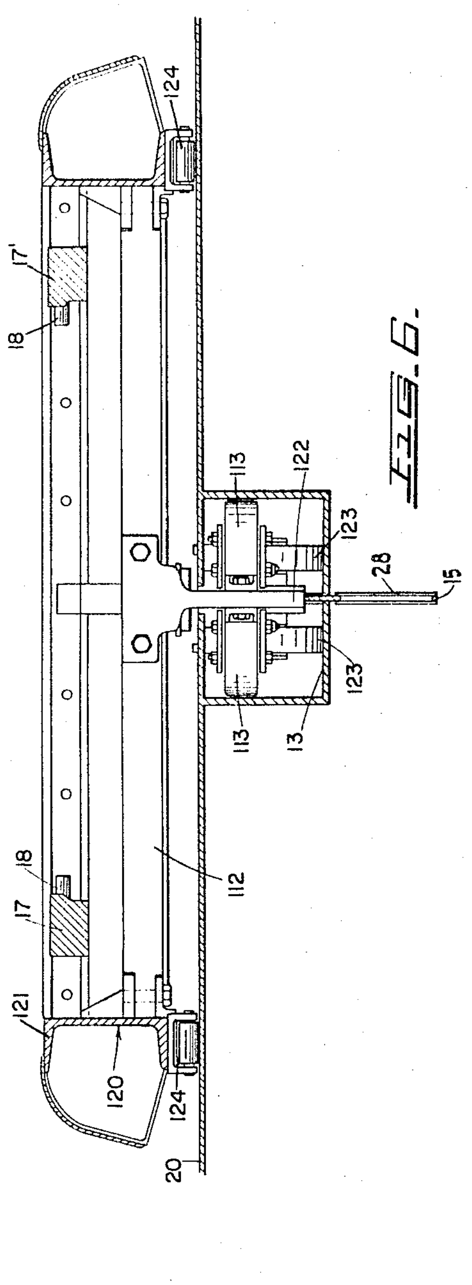
FIG. 6 is a sectional view taken along the line 6—6 of FIG. 3.

As shown in FIGS. 5 and 6 a shuttle guide rail is mounted along the inner vertical wall of the channel beam 121 at the forward of the main frame 120. A mutually opposed pair of longitudinally extending channels 130 and 131 are provided in the guide rail 128 and transverse beam 112 respectively slidably to receive a chain shuttle 132 which will be described in detail below with reference to FIGS. 13 and 14.

An identical shuttle guide rail 128 is provided at the aft end of the frame 120 slidably to receive a second chain shuttle 132′.

Brake drums 133 having chain sprocket 134 secured thereto in concentric superimposed relationship each are mounted for rotation in a horizontal plane at each corner of the main frame 120 between spaced apart mounting brackets 133′.

The sprockets 134 at the forward end of the main frame 120 (shown at the right hand side of FIG. 3) are so mounted that a drive chain 135, having one end secured to the chain shuttle 132, passes around the one sprocket 134 (the sprocket at the upper right hand corner of FIG. 3) and around the other sprocket 134 (the sprocket at the lower right hand corner of FIG. 3) and is then secured to the chain shuttle 132. An identical chain 135 is similarly provided on the sprockets 134 and chain shuttle 132′ at the aft end of the main frame 120 (shown at the left hand side of FIG. 3).

Figure 15:
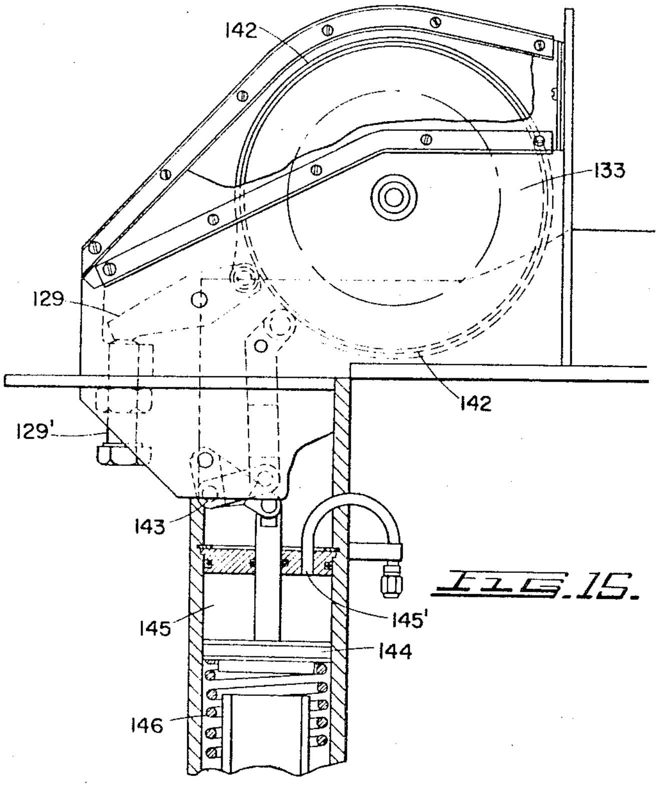
FIG. 15 is a top plan view of an air operated brake assembly.

A brake band 142 is provided on each of the brake drums 133 (see FIG. 15). Each brake band 142 extends around its respective brake drum 133 and one end of the band 142 is secured to the mounting bracket 133′ by means of a pivot member 129 which bears against adjustment screw 129′.

Brake linkage 143 associated with each brake drum 133 connects the other end of brake band 142 to a plunger 144 of a brake cylinder 145. The cylinder 145 is also secured to the main frame 120. Low pressure air is supplied to the cylinder 145 through air lines and controlled by solenoid valves to be described below with reference to FIG. 20. A return spring 146 in the brake cylinder 145 urges the plunger 144 outwardly to apply the brake. Air pressure is supplied through inlet port 145′ to move the plunger inwardly to release the brake.

The arresting rails 17 and 17′ (see FIGS. 3 and 5) extend from the forward end to the aft end of the main frame 120 and the ends of said arresting rails are slidably received in transverse channel members 138 and 139 secured to the main frame 120.

Each of the arresting rails 17 and 17′ is adapted to slide from one side of the main frame 120 to an opposing side of the main frame 120 to engage the other arresting rail. Rollers 18′ are preferably provided at each end of each of the rails 17 and 17′ to reduce friction during the slidable movement thereof. The arresting rail 17′ is provided with latches 140 and 141 at the ends thereof adapted to engage the arresting rail 17 at each end thereof, in a manner to be described in detail with reference to FIGS. 9, 10 and 11.

Figure 12:
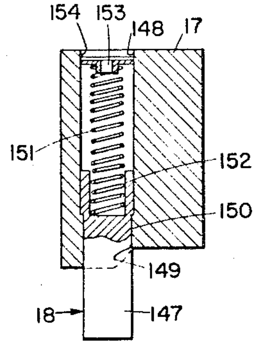
FIG. 12 is a section taken along the line 12—12 of FIG. 9.

Opposed vertical side faces of the arresting rails 17 and 17′ are provided with a plurality of spaced apart probe engaging pins 147, as shown more clearly in FIG. 12 an aperture 148 extending through the rail 17 are adapted to receive the pins. Each aperture 148 is provided with a portion of reduced diameter 149 corresponding to the reduced diameter 150 of the pin 147 thereby to limit the movement of the pin 147 in one direction. A spring 151, one end of which is received in a bore 152 in said pin, is adapted to urge the pin 152 outwardly. Such outward movement is limited by the reduced diameter 149 of the aperture 148. The other end of the spring 151 bears against an end cap 153. The end cap is retained in the bore 148 by a retaining ring 154.

Figure 7:
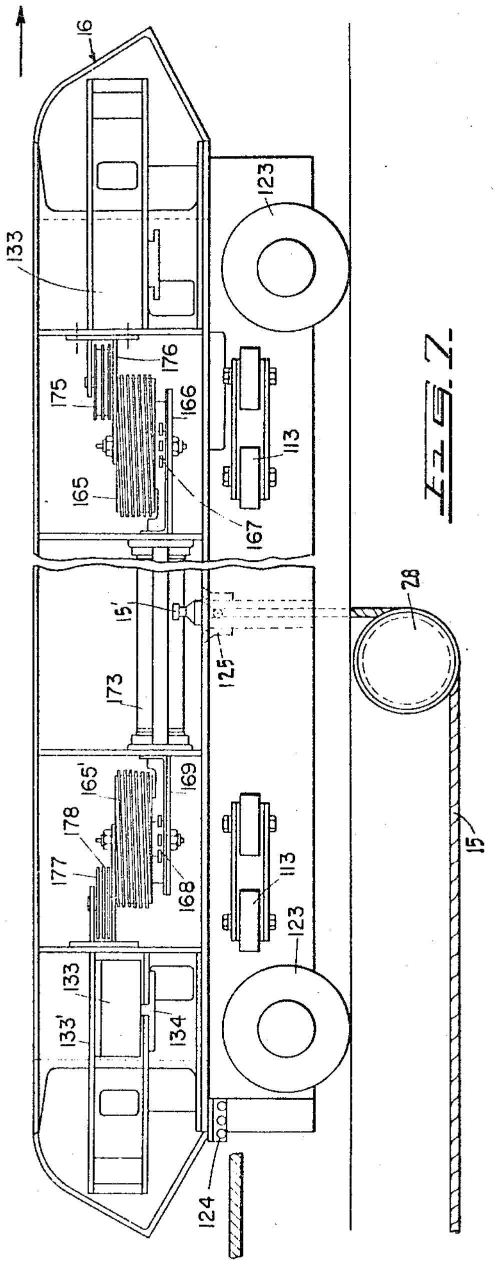
FIG. 7 is a fragmented side elevational view of the carriage of FIG. 4, the guard plates being removed.
Figure 8:
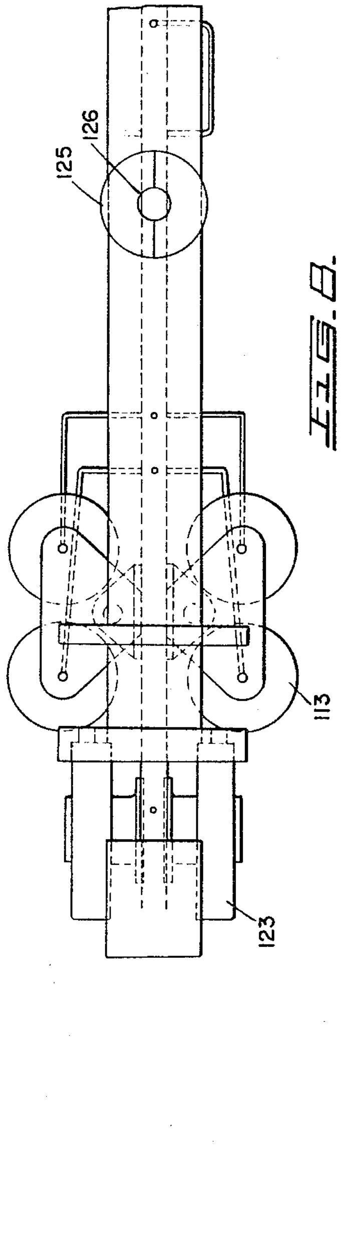
FIG. 8 is a top plan view of part of the shuttle beam assembly including supporting wheels and side guide wheels.
Figure 17:
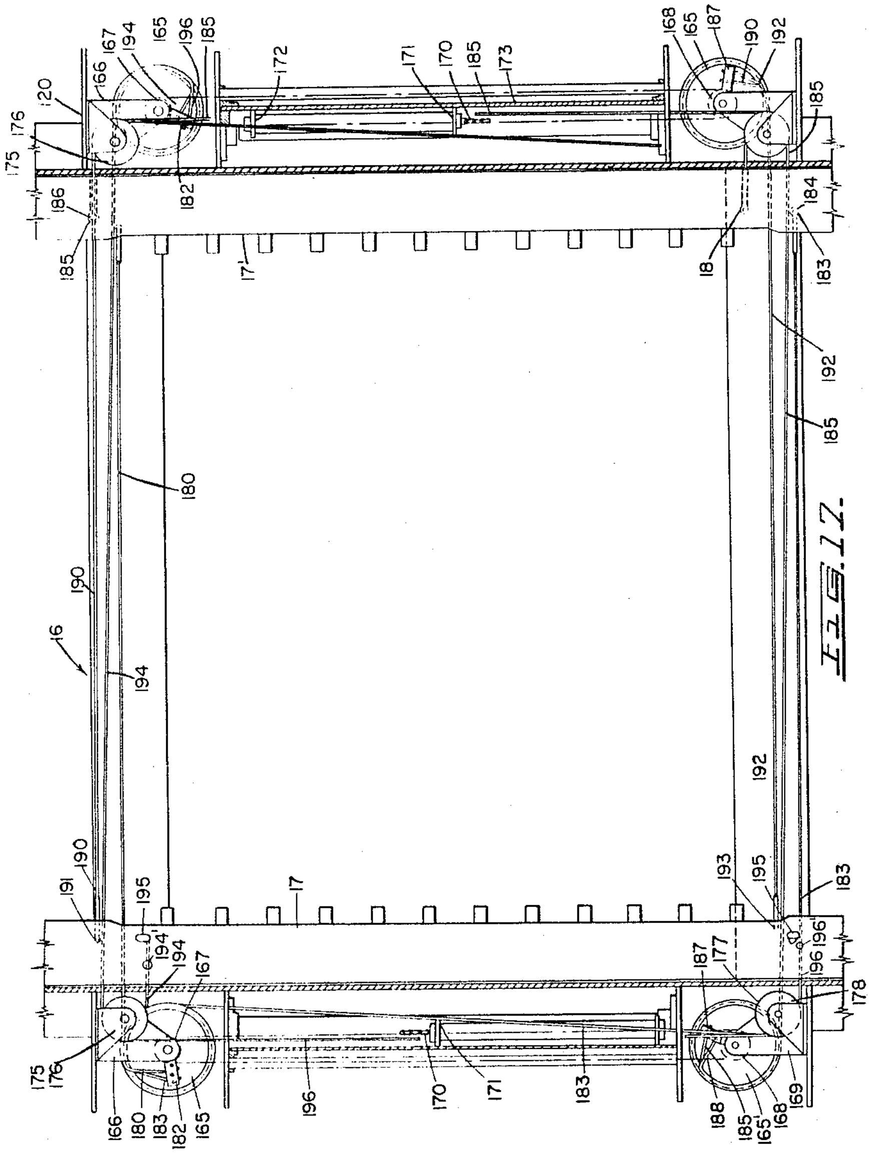
FIG. 17 is a top plan view of the carriage of FIG. 3 showing the cables and pulleys.
Figure 18:
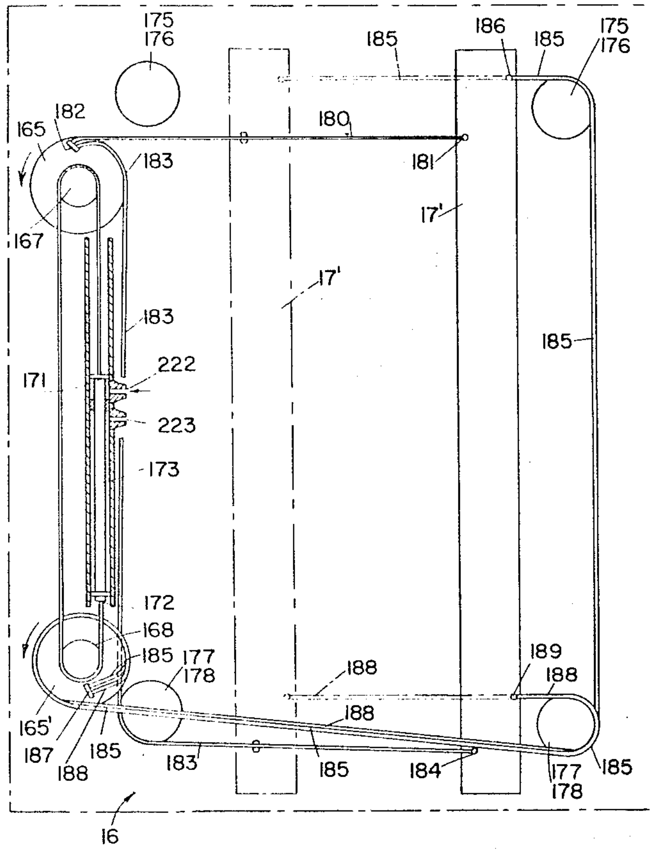
FIG. 18 is a diagrammatic top plan view of selected cables and pulleys of the carriage of FIG. 17.

Referring now to FIGS. 7, 17 and 18, an arresting rail drive pulley 165 is mounted for rotation in a horizontal plane adjacent each of the brake drums 133 at the forward end of the carriage 16. The drive pulleys 165 are mounted by means of brackets 166 secured to the carriage 16 by welding or other suitable means.

Drive sprockets 167 of lesser diameter than the drive pulleys 165 are secured thereto and have a common axis as shown in FIG. 7. Drive sprockets 168 similar to sprockets 167 and drive pulleys 165′, are rotatably mounted on brackets 169 adjacent each brake drum 133 at the aft end of the main frame 120.

A drive chain 170 passes around the drive sprockets 167 at the forward end and 168 at the aft end at each side of the main frame 120. Each end of each drive chain 170 is secured to its associated end fitting 171 and 172 of a double action piston assembly 173 secured to each side of the main frame 120 (as shown more clearly in FIG. 18). The piston assembly 173 will be described below with reference to FIG. 16.

A pair of pulleys 175 and 176 are mounted on a common axis for rotation in a horizontal plane on the frame 120 adjacent each of the drive pulleys 165. Similarly a pair of pulleys 177 and 178 are mounted for rotation adjacent each of the drive pulleys 165'.

As shown more clearly in FIG. 18, a cable 180 is secured to the right arresting rail 17' by securing means 181 and extends across the carriage 16, and is secured at its other end to the drive pulley 165 at the left side of the carriage. Similarly, a second cable 183 secured at one end to securing means 184 on the right arresting rail 17' extends across the carriage 16, passes over the pulley 178 and to the drive pulley 165. The remaining end of the second cable 183 is secured to the cable securing means 182 on the drive pulley 165.

A third cable 185 is secured at one end to the right arresting rail 17' by securing means 186, passes over the pulley 175, extends along the right side of the carriage 16, passes over pulley 178, extends across the carriage 16 and is wound on drive pulley 165'. The remaining end of the third cable 185 is secured to securing means 187 on the drive pulley 165'.

A fourth cable 188 is secured at one end to the right arresting rail 17' by securing means 189, passes over pulley 177, extends across the carriage 16 and is wound on drive pulley 165'. The remaining end of the fourth cable 188 is secured to the pulley 165' by securing means 187.

It will be noted that when the third and fourth cables 185 and 188 are wound on the drive pulley 165', the arresting rail 17' is at the right side of the carriage 16.

As shown in dashed lines in FIG. 18, when the first and second cables 180 and 183 are wound on the drive pulley 165, the rail 17' is moved to the left side of the carriage 16 which causes the third and fourth cables 185 and 188 to be unwound from the drive pulley 165'. This is due to a corresponding movement of the piston assembly 173.

Similarly as shown in FIG. 17, a further four cables are provided connecting the left hand rail 17 with the drive pulleys 165 and 165'. A fifth cable 190 is connected to the left arresting rail 17 at 191 and extends across the carriage 16 over pulley 176 down the right side of the carriage and is secured to the right hand drive pulley 165' by securing means 187. A sixth cable 192 is secured to the arresting rail 17 at 193, extends across the carriage 16, and is also secured to the drive pulley 165' at the right side of the carriage by securing means 187. A seventh cable 194 is secured at one end to securing means 194' at the upper forward end of arresting rail 17. The cable 194 then passes over the pulley 175 at the left side of the carriage 16 and extends across the carriage where its other end is secured to the drive pulley 165 by securing means 182. Finally, one end of an eighth cable 196 is secured to securing means 196' at the other lower aft end of the left arresting rail 17. The cable 196 then passes around pulley 177, along the left hand side of the carriage and over the pulley 176 across the carriage 16 to the right hand side thereof when it is secured to the drive pulley 165 by securing means 182.

Figure 13:
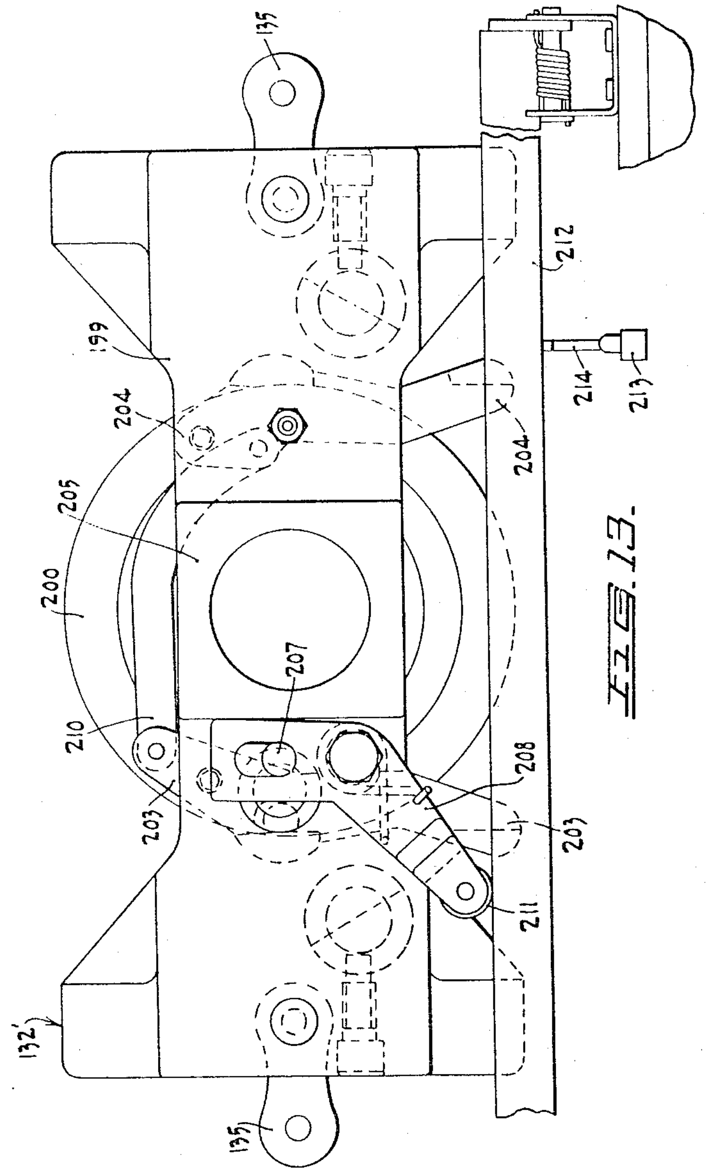
FIG. 13 is a top plan view of the shuttle block and the associated centering mechanism and control switch.
Figure 14:
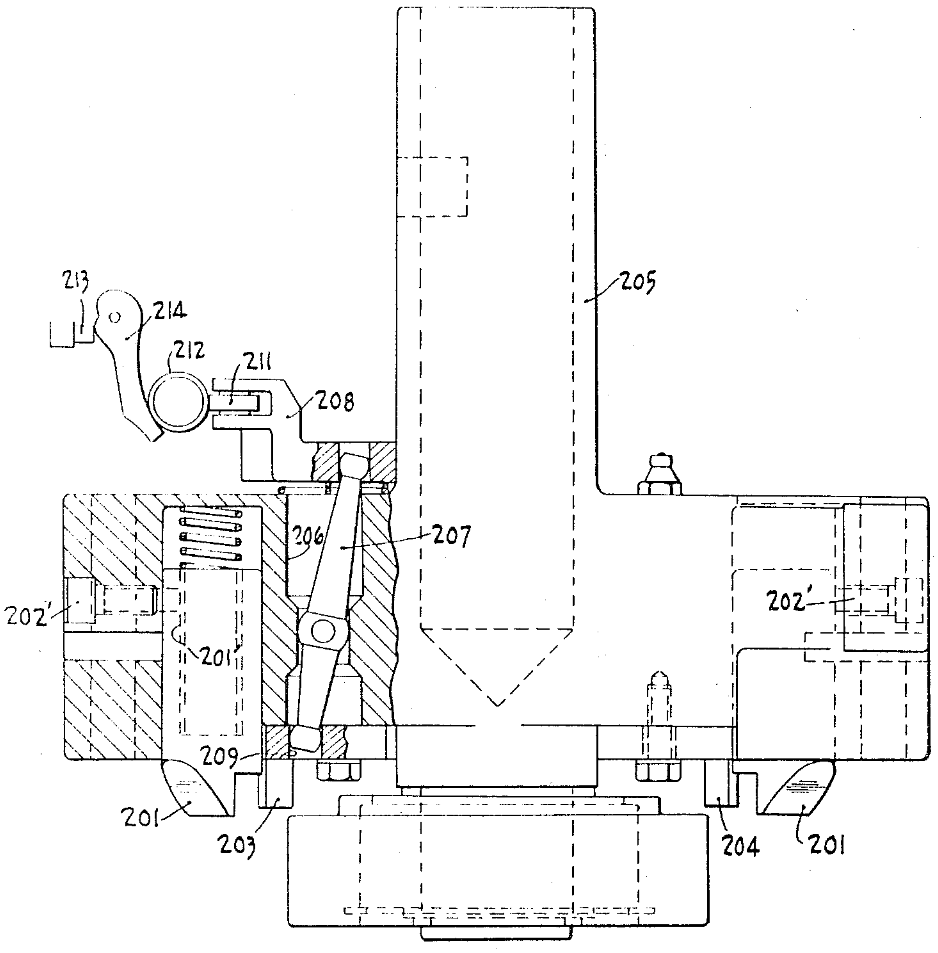
FIG. 14 is a side elevational view of the shuttle block of FIG. 13.

As illustrated in FIGS. 13 and 14, the chain shuttle 132' comprises a rectangular body 199, having a roller 200 rotatably mounted on the underside thereof. The side edges of the rectangular body 199 are adapted to be slidably received in the channels 130 and 131 of the guide rail 128 and the beam 112 respectively, as described above with reference to FIG. 5. Switch arms 203 and 204 are pivotally mounted on the underside of the body 199. The upper surface of the body 199 is provided with an upwardly extending block 205 adapted to extend above the guide rail 128 into the path of the arresting rails 17 and 17'. Chain shuttle 132 is of the same general shape as chain shuttle 132' but is not provided with the switch arms 203 and 204 and the associated mechanism described below.

A bore 206 extending through the body 199 receives a pawl 207 pivotally mounted therein, one end of which is received in a suitable aperture in a lever 208 pivotally mounted on the upper surface of the body 199. The other end of the pawl 207 is received in an aperture 209 in the arm 203.

A connecting member 210 is pivotally secured at its ends to the ends of the arms 203 and 204 adjacent their pivotal connections. A roller 211, provided on the lever 208, is adapted to contact a spring biased switch bar 212 which extends across the carriage 16. The switch bar 212 is adapted to operate a micro switch 213 through a pivot arm 214 therebetween.

A pair of spring biased slidable bolts 201 received in bores 202 in the body 199 of shuttles 132 and 132' at opposite sides of the roller 200 are retained therein and aligned by set screws 202' extending into channels 201' therein. The bolts 201 are adapted to engage the rails 21 and 22 to retain the shuttles 132' and 132 in contact with an associated one of the rails 21 and 22 respectively.

Figure 9:
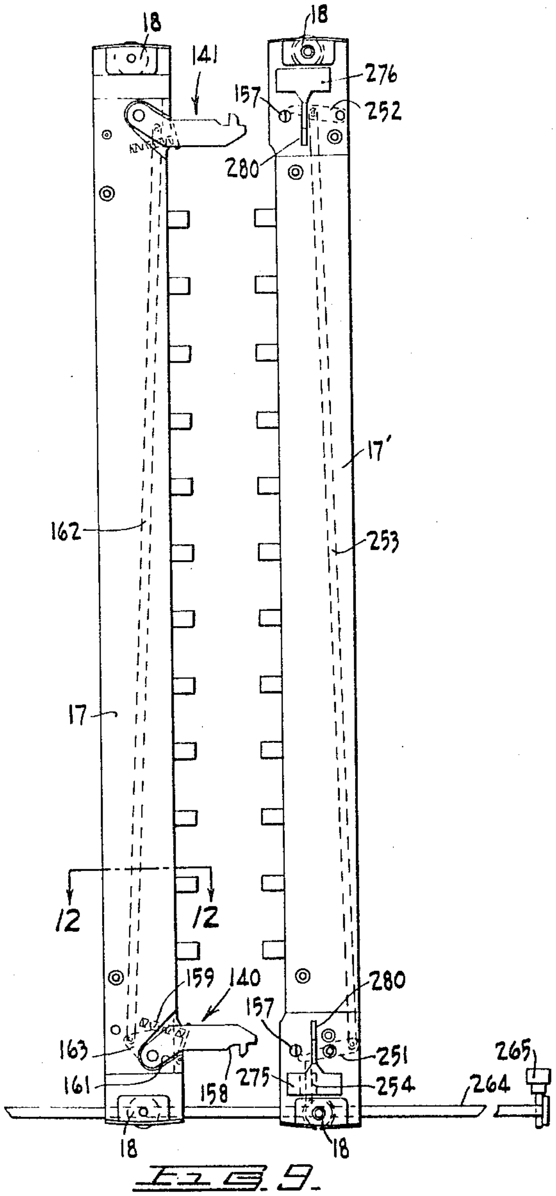
FIG. 9 is a top plan view of a pair of arresting rails including latches co-operating with locking pins.
Figure 10:
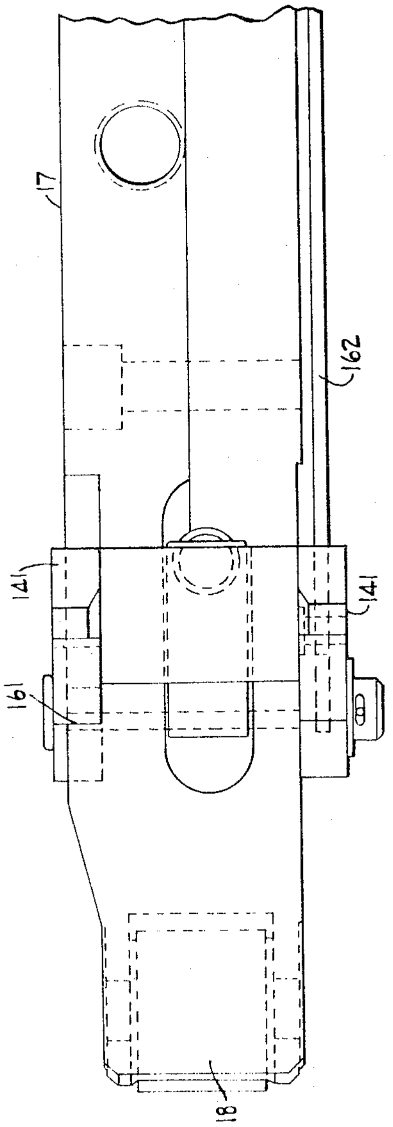
FIG. 10 is a fragmentary side elevational view of one of the arresting rails of FIG. 9.
Figure 11:
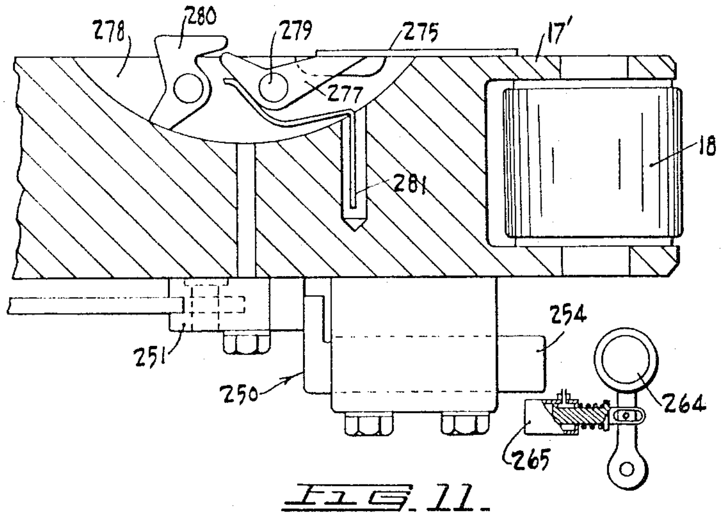
FIG. 11 is a side elevational view of a mechanism adapted to indicate that the arresting rails are locked together.

Referring now to FIGS. 9, 10 and 11, the upper and lower surfaces of the right arresting rail 17' are provided with locking pins 157 at each end thereof to co-operate with latches 140 and 141 of the left arresting rail 17.

Each of the latches 140 and 141 is bifurcated at both ends, one end being adapted to receive the rail 17 to facilitate pivotal connection thereto (see FIGS. 4 and 10), the other end defining a pair of latch members having indentations 158 to receive the projections 157 of the arresting rail 17'.

A helical compression spring 159 received in a recess 160 extending inwardly from the side face of the rail 17 biases the latch members outwardly. This outward movement of the latch members is limited by a shoulder 161 provided on the rail 17.

A bar 162 interconnects the end of the latches 140 and 141 adjacent their pivotal connections on the underside of the rail 17. It will be noted that the latch 140 is provided with an extended portion 163 to which the bar 162 is pivotally secured whereas the bar 162 is pivotally secured to the latch 141 adjacent the midportion thereof. Thus longitudinal movement of the bar 162 causes the latches 140 and 141 to move in opposite directions.

With reference to FIGS. 9 and 11 a latch release mechanism shown generally at 250 includes arms 251 and 252 pivotally mounted on the underside of the rail 17' adjacent the ends thereof and so positioned that an inner end of each of the arms 251 and 252 will engage the head of an associated one of the latches 140 and 141.

It will be noted that the pivot point of the arm 251 is adjacent its midpoint and that the pivot point of the arm 252 is adjacent the outer end thereof. In addition the arms 251 and 252 are interconnected by a strap 253 having an end pivotally secured to the arm 252 at its midpoint and pivotally secured at the other end to the arm 251 adjacent its outer end. Due to this particular arrangement of the pivotal connections movement of the inner end of the arm 251 in a direction to engage the latch 140 causes the arm 252 to move toward the latch 141.

The arm 251 is adapted to be moved into engagement with the latch 140 by a push rod 254 slidably mounted on the underside of the rail 17' (see FIG. 11).

An actuator rod 264 pivotally mounted on the frame 120 and extending transversely of the rails 17 and 17' is adapted to be moved by a pneumatic piston-cylinder assembly 265 having a return spring therein. The actuator rod 264 moves the push rod 254 which in turn moves the arm 251 thereby releasing the latch 140. Releasing the latch 140 in this manner also causes the latch 141 to be released due to the resulting longitudinal movement of the interconnecting bars 162 and 253.

In view of the importance of the rail locking phase it is desirable to have readily visible means to indicate that the rails 17 and 17' are locked together. Indicators 275 and 276, one of which will be described in detail, have therefore been provided on the rail 17' adjacent the ends thereof as illustrated in FIG. 9.

As shown in FIG. 11 the indicator 275 has an arm 277 extending into a recess 278 in the rail 17'. The arm 277 is pivotally secured to the rail 17' by pin 279. An extended portion of the arm 277 is adapted to be engaged by a pivotally mounted link 280. A leaf spring 281 acting on the underside of the arm 277 urges the arm toward a horizontal position.

It will be obvious particularly with reference to FIG. 9 that the head of the latch 140 will engage the link 280 so as to raise the indicator 275 when the locking pins 157 are received in the indentations 158 of the latch member.

Figure 16:
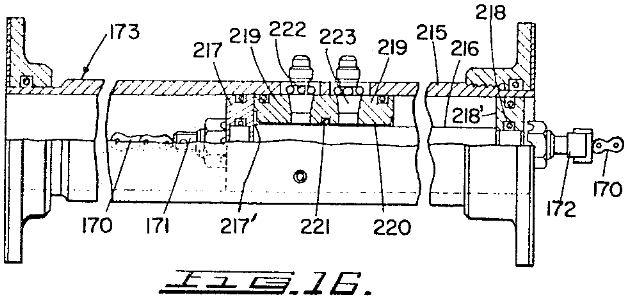
FIG. 16 is a sectional side elevational view of the piston assembly shown also in FIG. 4.

As illustrated in FIG. 16, the double action piston assembly 173 comprises a cylinder 215, a piston rod 216 slidably mounted therein and having enlarged heads 217 and 218 at each end thereof in sealing contact with the internal walls of the cylinder 215.

The cylinder 215 is divided at its midpoint by a cylindrical partition 219 having an aperture 220 through which the piston rod 216 extends. An airtight seal is provided between the piston rod 216 and the partition 219 by an O-ring 221 in the aperture 220 at the mid-point of the partition 219. Spaced apart air inlet ports 222 and 223 are provided in the cylinder 215, one port being on each side of the sealing ring 221. The ports 222 and 223 extend outwardly through the partition 219 and are adapted to supply air to the inner faces 217' and 218' of the enlarged heads of the piston.

*The housing and probe*

Figure 19:
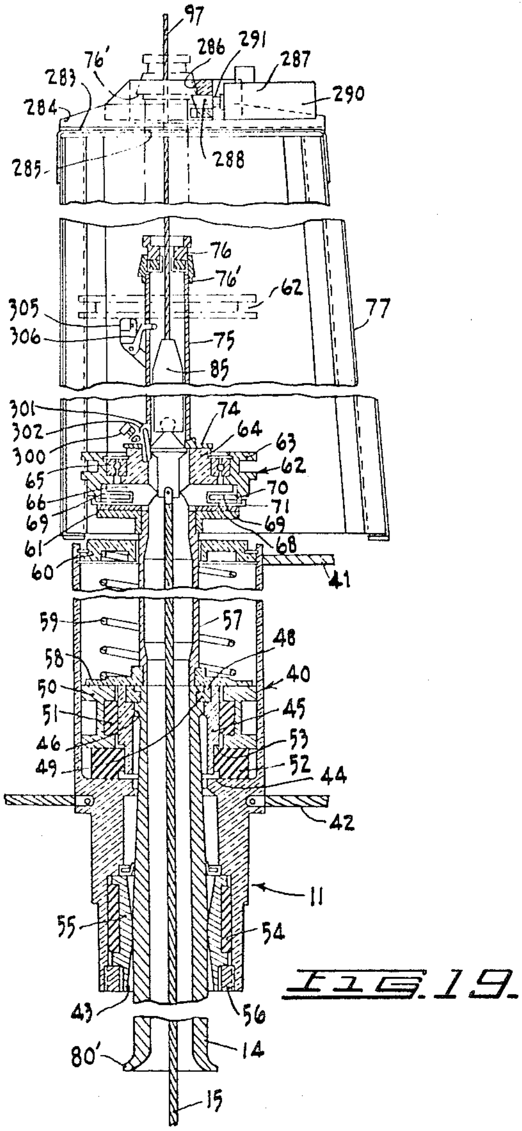
FIG. 19 is a sectional side elevational view of the probe and housing of FIG. 1.

With reference to FIGS. 1 and 19, the housing 11 comprises an outer cylinder 40 adapted to be installed in suitably aligned apertures in a floor panel 41 and a hull panel 42 of the helicopter 12 and bolted to the framework of the helicopter in a manner best suited to the structure of the particular helicopter to be used.

The mouth 43 at the lower end of the outer cylinder 40 is of reduced diameter and is provided with an internal annular shoulder 44. This shoulder 44 supports the lower end of a sleeve 45. The sleeve 45 has a bore 46 to receive the upper portion of the probe 14. A split retaining ring 48 is received in a groove 47 in the probe 14. The outer edge of the ring 48 is received in an annular groove 49 in the sleeve 45.

A spacer element 50 having an internal annular groove therein to receive a resilient buffer 51 is provided between the sleeve 45 and the housing 40. A resilient bumper element 52 which rests on the shoulder 44 of the housing 40 is adapted to be engaged by a shoulder 53 on the sleeve 45. The mouth 43 of the housing 54 is also provided with a buffer of rubber or other suitable material retained between, a tubular insert 55 and the housing 40. The insert 55 is held in place by a retaining ring 56 threadedly received in the mouth 43 of the housing 40.

Abutting the upper end of the probe 14 and forming an extension thereof is a tubular member 57 having its lower end threadedly received in a collar 58 adapted to rest on the upper ends of the sleeve 45 and the spacer element 52. A helical buffer spring 59 surrounding the tubular member 57 bears at its lower end against the collar 58 and at its upper end against an annular member 60 secured in the upper end of the outer cylinder 40.

The upper end of the tubular extension member 57 extends through a suitable aperture provided in the annular member 60 and threadedly receives an annular collar 61 adapted to support a locking mechanism indicated generally at 62.

The lock mechanism 62 includes a substantially circular cam ring 63 adapted to rotate about a hub 64 and is provided with a suitable bearing 65 therebetween.

A pair of lock bolts 66 are slidably mounted on a base 67 supported by the collar 61. The bolts 66 have bifurcated outer ends 68 between which rollers 69 are mounted. The rollers 69 ride on the internal cam surface 70 of the cam ring 63. It will be noted that the lower portion of the bifurcated outer end 68 of each bolt 66 extends outwardly and upwardly to define a projection 71 which engages the periphery of the cam ring 63.

The inner ends of the bolts 66 are adapted to engage the haul down cable end fitting 15' on rotation of the cam ring 63.

Figures 20, 21:
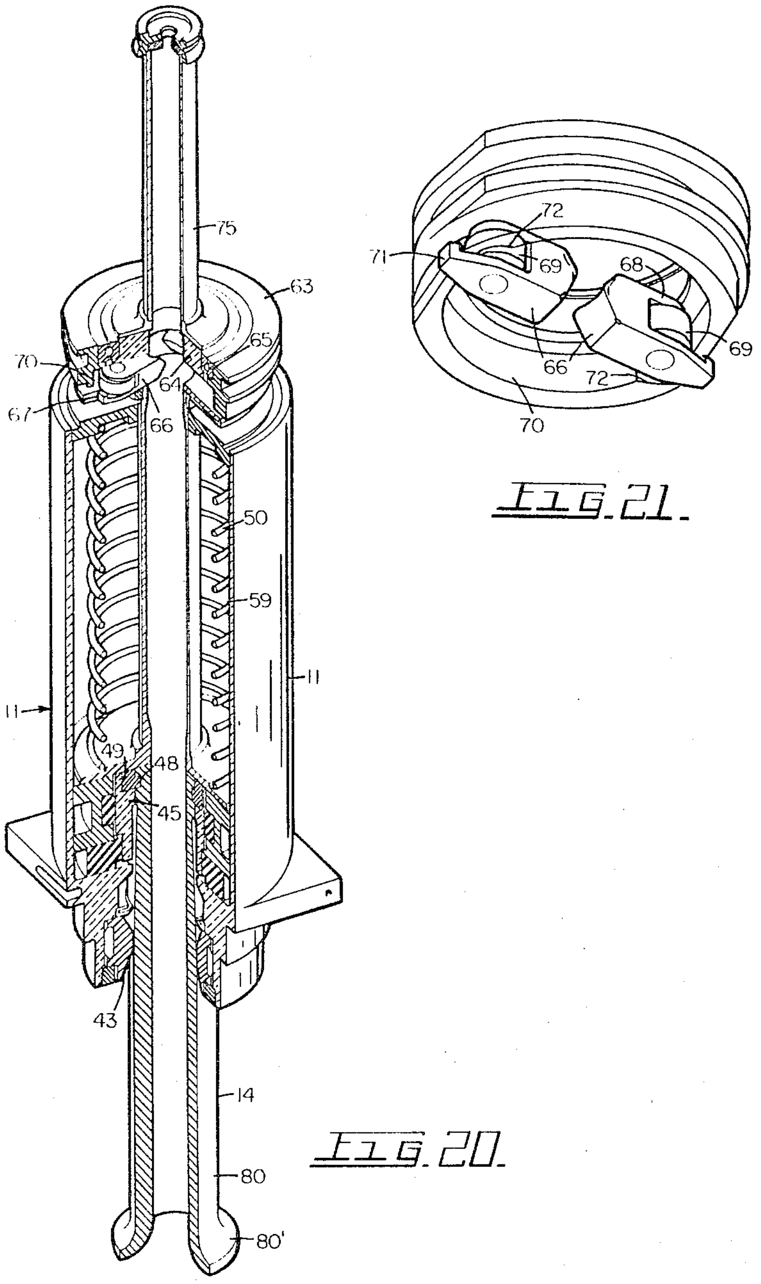
FIG. 20 is a perspective view partly in section of the probe and housing of FIG. 19.
FIG. 21 is a perspective view of elements of the locking mechanism shown in FIGS. 19 and 20.
Figure 22:
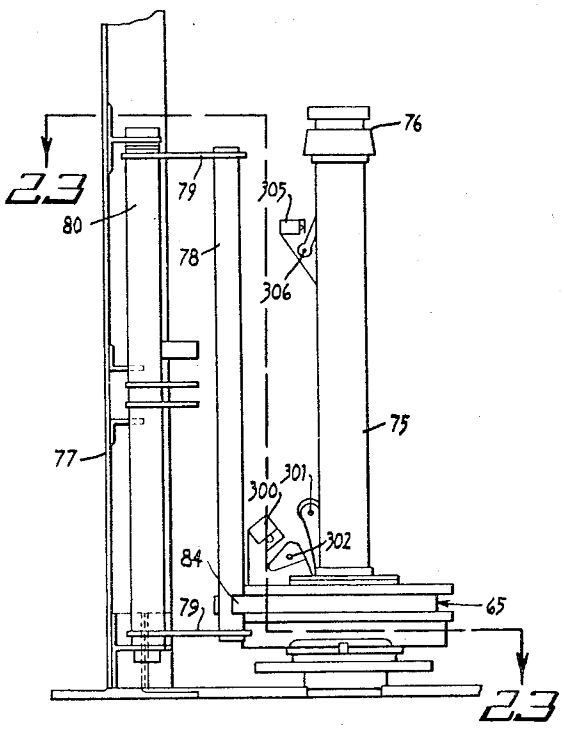
FIG. 22 is a fragmentary side elevational view of the upper portion of the probe and housing assembly of FIG. 19.
Figure 23:
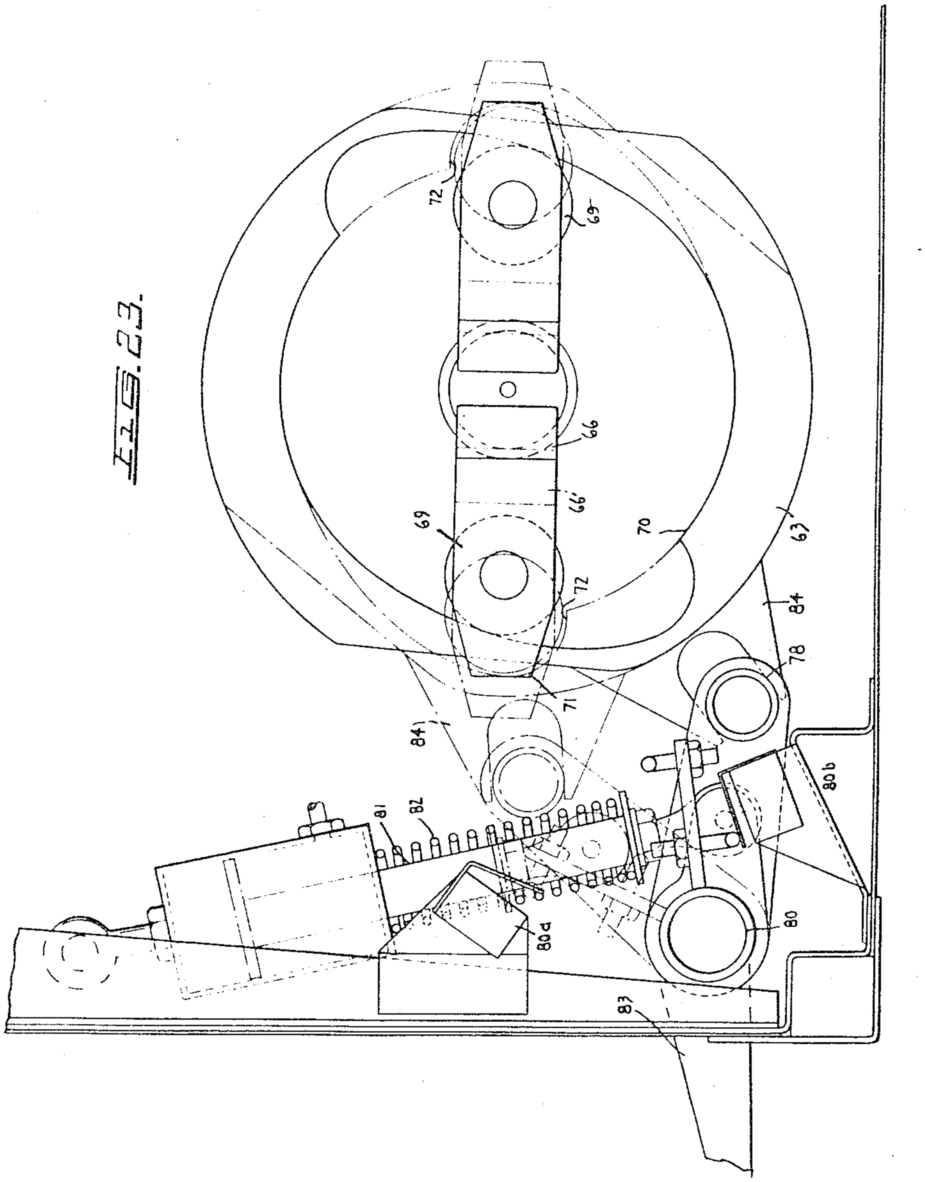
FIG. 23 is a partly sectional top plan view of the probe and housing taken along the line 23—23 of FIG. 22.

As shown more clearly in FIGS. 21 and 23 the internal surface 70 of cam ring 63 defines two diametrically opposed indentations 72 to receive the roller 69 when the bolts 66 are in a retracted position. The effective circumference of the cam ring 63 adjacent each of the indentations 72 is greater and thus the projection 71 riding thereon will cause the bolt 66 to be withdrawn.

The hub 64 is provided with an apertured cover plate 74 which threadedly receives one end of a tubular housing 75. An apertured cap 76 is secured on the upper end of the housing 75. An enclosure 77 is provided around the locking mechanism 62 and the tubular housing 75. It will be appreciated that as portions of the assembly including the probe 14 and the locking mechanism 62 are adapted to move relative to the housing 40; means must be provided to rotate the cam ring 63 at any point within the path of travel thereof. This is accomplished by providing a vertically extending actuator bar 78 having an arm 79 at each end thereof; each said arm being secured to a common shaft 80 mounted in the housing 77. A bifurcated projection 84 on the cam 63 engages the bar 78. The shaft 80 is adapted to be rotated by an hydraulic piston-cylinder assembly 81 including a return spring 82 or by a manually operable lever 83. It will be appreciated that the piston cylinder assembly 81 is of the type which retracts, when hydraulic fluid is introduced, due to movement of the piston into the cylinder. The spring 82 is compressed during inward movement of the piston. Micro switches 89*a* and 80*b* may be included at the ends of the arc described by bar 78 to indicate locking and unlocking of the lock mechanism 62.

With reference to FIG. 19 the enclosure 77 includes a top wall 283 and a cover plate 284 having aligned apertures 285 and 286 respectively therein through which the upper portion of the tubular housing 75 is adapted to extend. A latch assembly 287 having a bolt 288 adapted to engage the underside an annular lip 76' of the cap 76 at the upper end of the tubular housing 75 is provided on the cover plate 284. The latch 287 includes an hydraulic cylinder 290 having a piston 291 therein secured to or integral with the bolt 288. The bolt 288 is spring biased toward a latched position and is released by introducing hydraulic fluid into the cylinder 290. The latch 287 is used primarily to retain the probe 14 in a stored position when it is undesirable to have the probe extending below the hull of the helicopter. During the haul down and landing of the helicopter the latch 287 is retained in an inoperative position.

A messenger cable 97 one end of which is wound on the drum of a winch (not shown) in the helicopter 12 passes through the apertured cap 76 and its other end is provided with a substantially cylindrical coupling 85. The coupling 85 is adapted to be received in the continuous bore provided in the probe 14, the tubular member 57 and the tubular housing 75.

Figure 24:
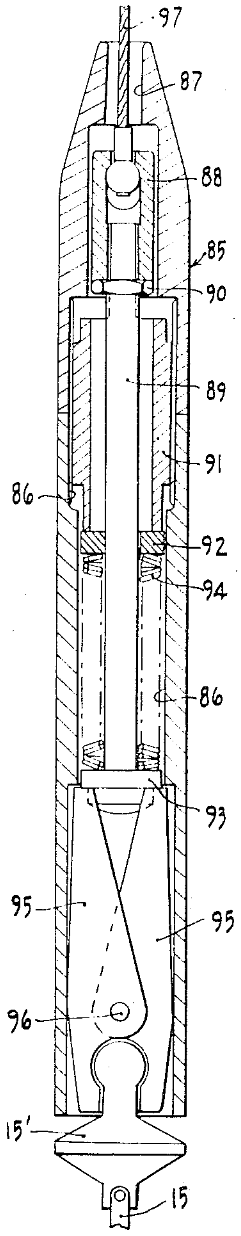
FIG. 24 is a sectional view of a messenger cable coupling also shown in FIG. 19.

The messenger cable coupling 85 shown in detail in FIG. 24, has a bore 86 therein which is restricted at an upper end thereof to define an aperture 87 slightly larger than the cable 97 which passes therethrough. The cable 97 is provided with a tubular fitting 88 secured to the end thereof in a conventional manner. The fitting 88 threadedly receives an upper end of a locking piston 89. A lock nut 90 is also provided on the threaded upper end of the piston 89. An adjusting sleeve 91 surrounding the upper portion of the piston 89 threadedly engages the wall of the bore 86 and is engaged at its lower end by an annular seat 92. The seat 92 is spaced from an enlarged end portion or head 93 of the piston 89 by resilient means 94 preferably a plurality of spring washers known as Bellville washers.

A pair of catches 95 pivotally secured together and to the coupling 85 by a pin 96 are contoured at their lower ends to engage the haul down cable end fitting 15' therebetween. The other ends of the catches are tapered to receive the head 93 of the locking piston 89 therebetween.

In FIG. 24 of the drawings the catches 95 are shown in a locked position engaging the end fitting 15' wherein the head 93 spreads the inner ends of the catches 95 and the head 93 is biased toward the catches 95 by the springs 94. Unlocking of the catches 95 takes place when sufficient tension is applied between the end fitting 15' and the messenger cable 97 to compress the spring 94 between the head 93 and the annular member 92 to cause the head 93 to be withdrawn from between the catches 95.

To provide access to the adjusting sleeve 91 the messenger cable coupling is fabricated in two sections threadedly joined by the sleeve 91.

A micro switch 300 provided on the cover plate 74 is adapted to be actuated by a pivotal switch arm 301 and a pivotal link 302 therebetween. The switch arm 301 which is received in suitable recess in the cover plate 74 and hub 64 extends into the path of the fitting 15' at its upper limit of travel.

A further micro switch 305 mounted on the housing 75 is adapted to be actuated by a pivotal switch arm 306 which extends through a slot in the housing 75 into the path of the coupling 85. The switch arm 306 is so positioned as to be engaged by the coupling 85 as its upper end approaches the cap 76.

Figure 25:
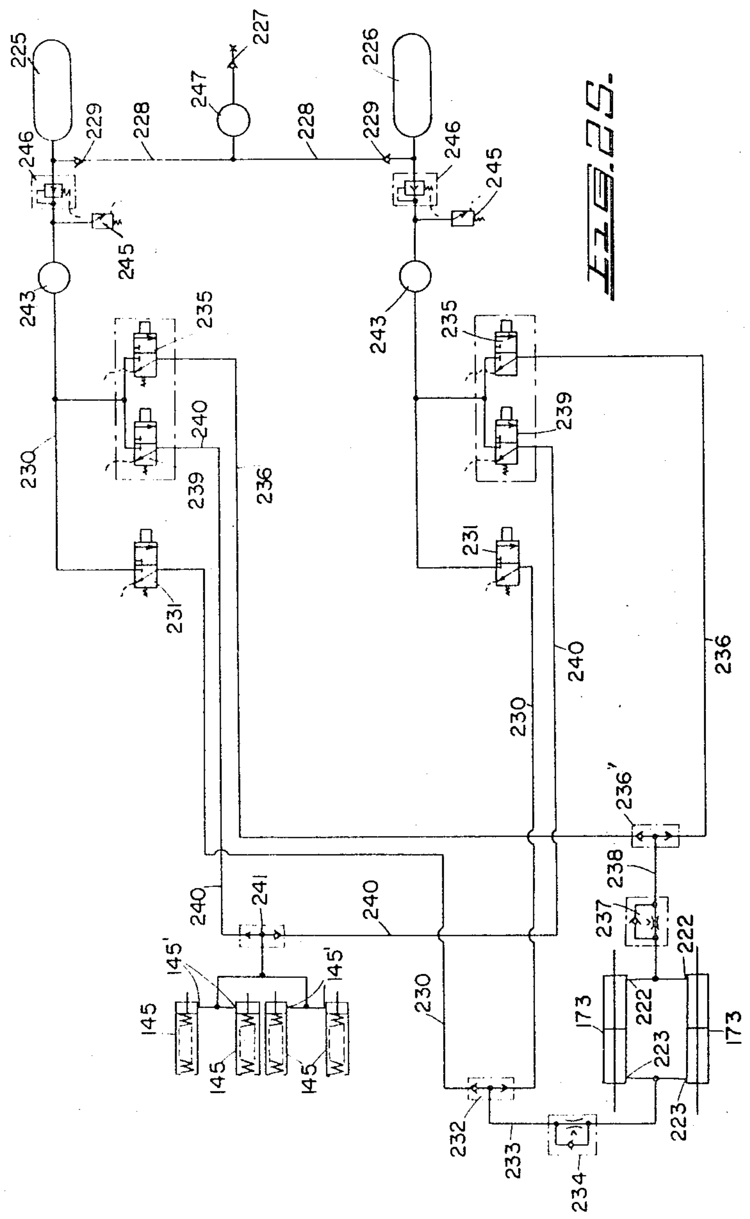
FIG. 25 is a schematic drawing showing the electrical circuits, switches, solenoid operated air valves and air lines to operate various moving parts of the landing and securing device of this invention.

In FIG. 25 a schematic illustration of the compressed air system is shown including a primary compressed air bottle 225 and an auxiliary compressed air bottle 226. It will be noted that the system is duplicated so that air can be supplied to the brake cylinder 145 and to the pistons 173 from either of the air bottles 225 and 226.

A charging valve 227 is connected to air bottles 225 and 226 by a common line 228. A filter 247 is also provided in the charging line to line 228 in order to assure that the line 228 be free of extraneous matter. As the compressed air system associated with the bottles 225 is identical to the system associated with air bottle 226 only the system associated with air bottle 225 need be described.

A check valve 229 is provided in the air line 228 adjacent the bottle 225. The air line 228 is connected to an air line 230 which interconnects the bottle 225 and the inlet ports 223 of each of the pistons 173. A solenoid valve 231 is provided in the line 230. The solenoid 231 is of the type having an inlet port blocked and an outlet port open to the atmosphere when de-energized.

In order to separate the compressed air systems associated with the two supply bottles 225 and 226, the lines 230 therefrom are connected to a shuttle valve 232.

A line 233 between the shuttle valve 232 and the inlet ports 223 of the piston assembly 173 is provided with a conventional flow control valve 234. Similarly, a second solenoid valve 235 identical to solenoid valve 231 is provided in an air line 236 which interconnects the line 230 with a shuttle valve 236'. A conventional flow control valve 237 is provided in a line 238 connecting shuttle valve 236 with the inlet ports 222 of each of the piston assemblies 173.

A third solenoid valve 239 identical to those described above is provided in an air line 240 which interconnects the line 230 with a shuttle valve 241. The shuttle valve 241 is connected to the inlet ports 145' of each of the four brake cylinders 145.

The solenoid valve 239 is electrically connected to the micro switch 213 not shown here but described above with reference to the chain shuttle 132 of FIGS. 13 and 14.

Lubricating means 243 may be provided as shown to lubricate the brake cylinder 145 and piston assemblies 175. A pressure relief valve 245 and pressure control valve 246 are also provided in the lines 230.

*Operation of the probe and housing*

In operation when a hovering helicopter is preparing to land on the ship's deck, the messenger cable 97 and its associated coupling 85 are lowered to the deck from the helicopter. The end fitting 15' of the haul down cable 15 is inserted in the coupling 85 as as to be engaged by catches 95 therein. The winch in the helicopter draws the coupling 85 and the attached haul down cable into the probe 14 and the tubular member 57.

The locking bolts 66 having been moved radially outwardly by actuating the piston-cylinder assembly 81 to rotate the cam ring 63 (as shown in chain lines in FIG. 23), the haul down cable end fitting 15' moves into the lock mechanism 62 until it engages the apertured cover plate 74. The fitting 15' at this position pivots the switch arm 301 outwardly and the contacts of the micro-switch 300 are closed. An electrically operated valve (not shown) is energized by the operation of the micro-switch 300 allowing hydraulic fluid to escape from the piston cylinder assembly 81. The return spring 82 causes the piston of the assembly 81 to extend thereby moving the bar 78 and the cam ring 63 to the positions indicated in full lines in FIG. 23. This rotation of the cam ring 63 causes its cam surface 70 to act upon the rollers 69 thereby moving the bolts 66 radially inwardly to engage the haul down cable end fitting 15'.

The winch in the helicopter continues to draw the coupling 85 upwardly and the probe 14 also moves therewith due to the engagement of the end fitting 15' with the cover plate 74 until the cap 76 of the tubular housing engages the cover 284 of the housing 77. The resulting tension in the cable 97 causes the coupling 85 to release the fitting 15' and the probe 14 descends.

The coupling 85 when released moves relative to the tubular housing 75 and engages the arm 306 of the micro-switch 305. Thus the contacts of the micro-switch 305 are opened and the helicopter winch is de-energized.

The haul down phase of the landing operation commences when the fitting 15' is fully inserted and locked in the housing 11. The haul down cable 15 is wound on the drum 24 of the winch 23 on the ship's deck. The power of the winch 23 exceeds that of the upward thrust of the helicopter and the helicopter is winched in toward the deck. Should trouble of any kind develop at this phase of the landing operation the helicopter pilot can release the haul down cable by hydraulic or manual operation of the release locking mechanism 62 as described above.

The next phase of the landing operation is that of securing the probe 14 in the carriage 16 as the helicopter 12 settles on the deck 20.

Figure 4:
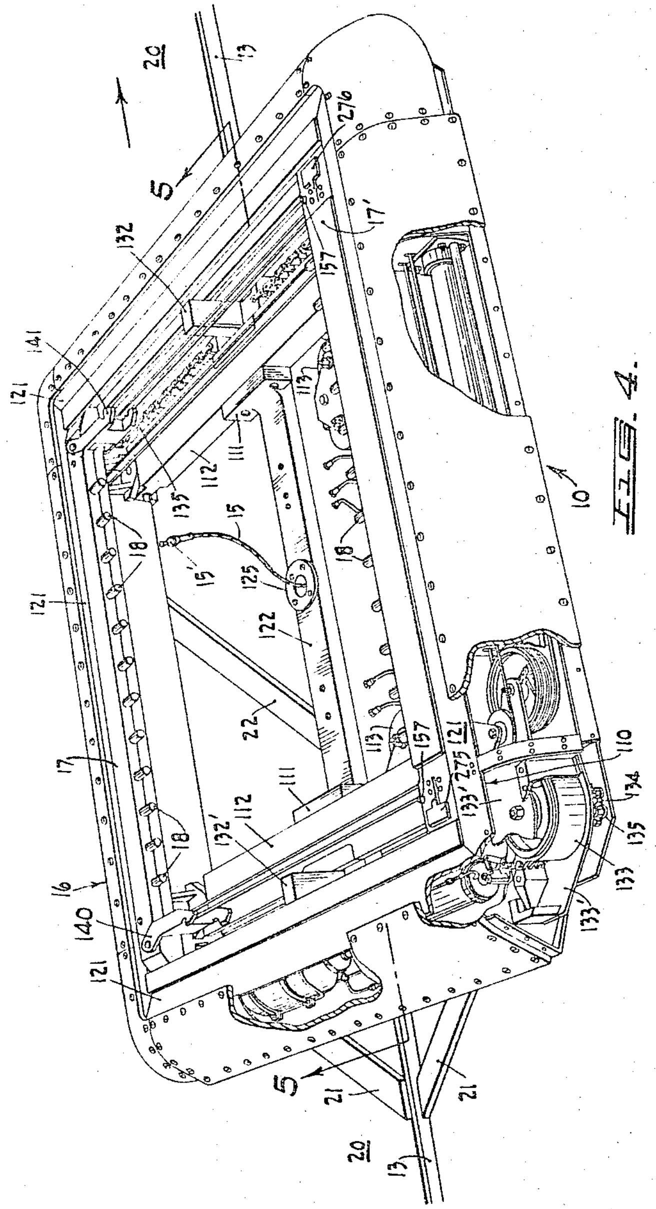
FIG. 4 is a perspective view of the carriage installed on the deck of a ship.

To accomplish this the arresting rails 17 and 17' have been moved to opposing sides of the carriage 16 as shown in FIG. 4. This operation will be referred to below as "cocking" the arresting rails. Cocking of the arresting rails takes place when the operator energizes solenoid 231 to supply compressed air to each of the inlet ports 223 (see FIG. 25) thereby moving the left hand pistons 173 fully rearwardly (FIGS. 17 and 18) and causing movement of the chains 170 and the associated sprockets 167 and 168 and the drive pulleys 165 and 165'.

Assuming locking bolt assemblies 140 and 141 have been released if necessary (see FIG. 9) by actuating the pneumatic assembly 265, cables 185 and 188 are wound on the drive pulley 165' at the left side of the carriage 16 thereby moving the right arresting rail 17' toward the right side of the carriage 16 as viewed in FIGS. 17 and 18. Similarly, piston 173 at the right side is moved fully forwardly and cables 194 and 196 are wound on the drive pulley 165 at the right side of the carriage 16 moving left arresting rail 17 to the left side of the carriage 16.

When the haul down operation has progressed to the stage where the cylindrical body of the probe 14 is between the arresting rails 17 and 17', the arresting rails 17 and 17' are moved toward each other. This operation will be referred to below as "firing" the arresting rails.

Firing the arresting rails takes place when the operator energizes the solenoid 235 to supply compressed air to each of the inlet ports 222 (see FIG. 20) thereby moving the pistons 173 at the left side fully forwardly (FIGS. 17 and 18) and causing movement of the chain 170 and the associated sprockets 167 and 168 and the drive pulleys 165 and 165'.

Cables 180 and 183 are wound on the drive pulley 165 at the left side of the carriage thereby moving the right arresting rail 17' toward the left side of the carriage 16 as shown in dashed lines in FIG. 18. Similarly the piston 173 at the right side of the carriage is moved fully rearwardly and cables 190 and 192 are wound on the drive pulley 165' at the lower aft end of the carriage 16 causing left arresting rail 17 to move toward the right hand side of the carriage 16.

The probe 14 will rarely if ever be drawn into the center of the carriage so that the rails must meet the probe 14 at one side of the carriage.

Figure 3:
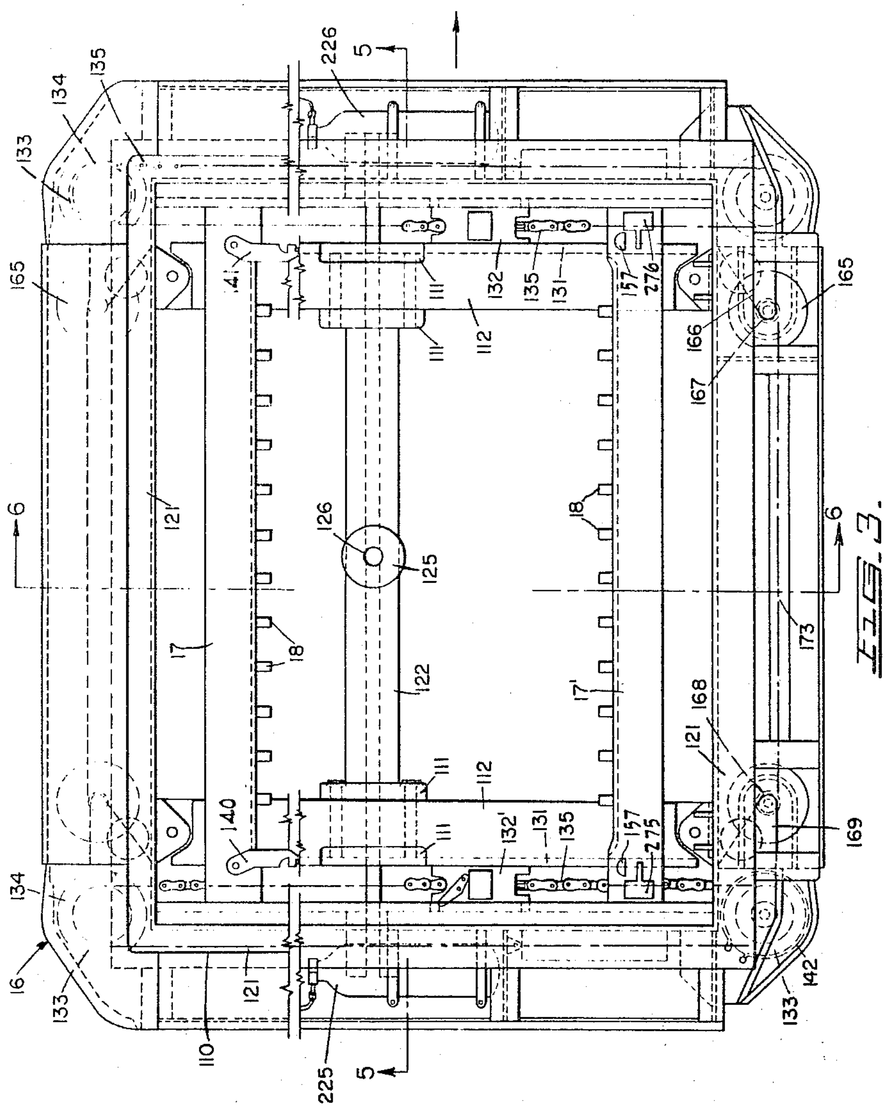
FIG. 3 is a top plan view of the carriage.

In moving across the carriage 16, one of the rails will pick up the chain shuttles 132 and 132' (see FIGS. 3 and 4). For this reason the brake bands 142 must be released to allow movement of the chain shuttles 132 and 132' and their associated drive chains 135, sprockets 134 and brake drums 133. To release the brake bands 142, the operator energises solenoid valve 239 to supply compressed air to the inlet ports 145' of each of the brake cylinders 145 (see FIG. 25). As shown more clearly in FIG. 15, the compressed air moves the plunger 144 inwardly against return spring 146 causing the brake linkage 143 associated with brake band 142 to release the band 142 from the brake drum 133.

When the rails 17 and 17' engage the probe 14, the solenoid 239 is de-energized and the compressed air which forced the plungers 144 inwardly is allowed to escape the atmosphere through the port provided for this purpose in the solenoid valve 239. The brake bands 142 are re-applied through the action of return springs 146. The probe 14 is then secured against lateral movement as the latches 140 and 141 of the rail 17 have engaged the locking pins 157 of the rail 17' described above with reference to FIG. 9.

Fore and aft movement of the probe 14 is prevented by the probe engaging pins 18. It will be apparent that should the probe 14 be positioned between opposed pins 18 when the rails 17 and 17' come together the pins 18 will be depressed until forward or rearward movement of the probe 14 to a position between adjacent pins (of the same rail). Then the pins 18 will again be projected by their associated return spring, thus preventing any further forward and aft movement of the probe 14.

The flange 80' on the lowermost portion of the cylindrical body of the probe 14 prevents vertical movement of the probe 14 in an upward direction. It is intended that the helicopter 12 rest on its own landing gear. However, to accommodate differences in tire pressure of such landing gear and to compensate for contingencies in the landing operation which might cause the entire weight of the helicopter (18,000 lbs.) to be placed on the probe 14 and housing 11, the housing 11 is so constructed that only the outer cylinder 40 (see FIG. 20) is fixedly secured to the fuselage of the helicopter. The annular member 60 is secured to the cylinder 40 but all the remaining elements are adapted to move upwardly. Such upward movement of collar 58 and the tubular member 57 will compress the buffer spring 59.

The helicopter 12 having been landed and the probe 14 grasped between the arresting rails 17 and 17' the haul down cable end fitting 15' is released from its engagement with the locking mechanism 62 thereby allowing the haul down cable 15 and the fitting 15' to be withdrawn through the fair lead 125. It is then possible for the carriage 16 to move without trailing the haul down cable 15.

It is considered desirable to center the helicopter 12 laterally with respect to the carriage, before moving the helicopter 12 into the hangar (not shown). This centering operation is accomplished by winding the towing cable 26 on the drum 25 of the winch 23 to tow the carriage 16 rearwardly (see FIGS. 1 and 2). This rearward movement of the carriage 16 causes one of the switch arms 203 and 204 (see FIGS. 13 and 14) of the chain shuttle 132' to contact its associated centering rail 21 depending upon the position of the probe with respect to the center line of the carriage 16. In addition the adjacent spring loaded bolts 201 will be moved upwardly by the rails 21 and 22 and be urged down on the other side of the rails thereby preventing the shuttles 132 and 132' from leaving the rails 21 and 22 until they reach the ends thereof.

Movement of one of the interconnected switch arms 203 or 204 causes corresponding movement of the pawl 207 and pivotal movement of the lever 208. The lever 208 in turn urges the switch bar 212 against the pivot arm 214 which pivots to operate micro-switch 213. The micro-switch 213 energizes the solenoid valve 239 described above with reference to FIG. 25 to release the brake bands 142. The arresting rails 17 and 17' and the chain shuttles 132 and 132' and the probe 14 locked therebetween are now free to move. This lateral movement of the chain shuttles 132 and 132' is accomplished by both centering rollers 200 of the chain shuttles 132 and 132' each bearing against one of the pair of centering rails 21 and 22, depending whether the arresting rails 17 and 17' and probe 14 are at the right or left side of the centerline of the carriage 16. Further movement of the carriage 16 rearwardly causes the centering rollers 200 to be forced towards the centerline of the carriage 16. When they reach the center line of the carriage 16 the rollers 200 meet a gap between the inner ends of each pair of centering rails 21 and 22. In this gap the switch arms 203 or 204 of the shuttle block 132' come out of contact with the rail 21 and the brake bands 142 are re-applied so that the arresting rails 17 and 17' and the probe 14 maintain the desired lateral position.

The helicopter is straightened so as to be aligned with the trough 13 in the ship's deck by further aft movement of the carriage. This straightening is due to the action of the forward landing wheels as the helicopter is towed rearwardly (in somewhat the same manner as a two wheel trailer following its tow point).

When the helicopter is straight a "tail probe" in the vicinity of the helicopter tail wheel is dropped into a center line slot. Then it is possible to reverse the winch 23 and move the helicopter forward into its hangar with the tail probe following the slot and keeping the helicopter straight.

We claim:

1. A device for landing and securing aircraft of the rotor sustaining or hovering type on a platform, said device comprising:

(a) a housing adapted to be secured to said aircraft and forming the female member of a coupling;

(b) a probe adapted to be telescopically received in and secured to said housing;

(c) a first winch adapted to be secured to said platform and having a first cable mounted thereon;

(d) means on the other end of said first cable forming the male portion of said coupling;

(e) a winch carried by said aircraft;

(f) a second cable secured to said second winch and adapted to be secured to said means for raising said means into said housing, and (g) means adapted to be secured to said platform for grasping said probe.

2. A device for landing and securing aircraft of the rotor sustaining or hovering type on a carriage secured to and movable on a deck of a ship, said device comprising:

(a) a housing adapted to be secured to said aircraft and forming the female member of a coupling;
(b) a probe telescopically received in and secured to said housing;
(c) a first winch adapted to be secured to said deck;
(d) a first cable on said first winch;
(e) means secured to an end of said first cable, said means forming the male portion of said coupling;
(f) a winch carried by said aircraft;
(g) a second cable secured to said second winch and adapted to be secured to said means on said first cable for raising said means and the first cable attached thereto into said housing, and
(h) means adapted to be secured to said carriage for grasping said probe.

3. A device for landing and securing aircraft of the rotor sustaining or hovering type on the deck of a ship, said device comprising:

(a) a housing adapted to be secured to said aircraft and forming the female member of a coupling;
(b) a probe telescopically received in and secured to said housing;
(c) a first winch adapted to be secured to said deck;
(d) a first cable on said first winch;
(e) means adapted to be secured to an end of said first cable, said means forming the male portion of said coupling;
(f) a winch carried by said aircraft;
(g) a second cable secured to said second winch and adapted to be secured to said means for raising said means into said housing;
(h) a carriage adapted to be secured to but movable along said deck;
(i) a pair of parallel rails mounted on said carriage and adapted to move slidably towards each other to receive said probe therebetween; and
(j) means on at least one said rail to limit longitudinal movement of said probe with respect to said rails.

4. A device for landing and securing aircraft of the rotor sustaining or hovering type on a deck of a ship, said device comprising:

(a) a housing adapted to be secured to said aircraft;
(b) a probe telescopically received in and secured to said housing and forming the female member of a coupling;
(c) a first winch adapted to be secured to said platform;
(d) a first cable on said first winch;
(e) means secured to an end of said first cable, said means forming the male portion of said coupling;
(f) a second winch carried by said aircraft;
(g) a second cable secured to said second winch and adapted to be secured to said means secured to said first cable for raising said first cable into said probe and housing;
(h) a carriage adapted to be secured to but movable along said deck;
(i) a pair of parallel rails mounted on said carriage and adapted slidably to be moved towards each other to secure said probe between said rails, said movement being accomplished by at least one cable secured to each said rail and a drum associated with each cable;
(j) locking means carried by one said rail to co-operate with means on said other rail to lock said rails together, and
(k) spring biased pins on at least one said rail extending toward the other said rail, said pins being adapted to limit longitudinal movement of said probe with respect to said rail.

5. A device for landing and securing aircraft of the rotor sustaining or hovering type on a deck of a ship, said device comprising:

(a) a housing adapted to be secured to said aircraft;
(b) a tubular probe telescopically received in and secured to said housing, said probe forming the female member of a coupling;
(c) a first winch adapted to be secured to said platform;
(d) a first cable on said first winch;
(e) a fitting adapted to be secured to an end of said first cable, said fitting forming the male portion of said coupling;
(f) a second winch carried by said aircraft;
(g) a second cable secured to said second winch and adapted to be secured to said fitting for raising said first cable into said probe and said housing;
(h) a carriage adapted to be secured to, but movable along said deck;
(i) a pair of parallel rails mounted on said carriage and adapted slidably to be moved towards each other to secure said probe between said rails, said movement being effected by at least one cable secured to each said rail and a drum associated with each cable;
(j) locking means carried by one said rail to co-operate with means on said other rail to lock said rails together;
(k) spring biased pins on at least one said rail extending toward the other said rail, said pins being adapted to limit longitudinal movement of said probe with respect to said rail, and
(l) means for selectively preventing movement of said rails, said means comprising an endless belt disposed transversely of said rails and entraining spaced apart pulleys, a block secured to said belt between said rails and adapted to be engaged by at least one of said rails; and friction braking means adapted to be applied to at least one of said pulleys.

6. A coupling for use in a device for landing and securing a movable object with respect to a fixed platform, said coupling comprising:

(a) a housing adapted to be secured to said movable object;
(b) a winch mounted on said platform;
(c) a haul down cable on said winch;
(d) a fitting adapted to be secured to an end of said haul down cable;
(e) securing means mounted on said platform;
(f) a probe telescopically received in and secured to said housing and adapted to be grasped by said securing means, said probe having a bore therein adapted to receive said fitting, and
(g) locking means in said housing adapted to secure said fitting therein, said locking means being adapted to be actuated by said fitting.

7. A coupling for use in a device for landing and securing aircraft of the rotor sustaining or hovering type on the deck of a ship, said device having a first winch adapted to be secured to said deck, a first cable on said first winch, a fitting adapted to be secured to an end of said first cable, a second winch carried by said aircraft, a second cable secured to said second winch and adapted to be secured to said cable end fitting, said coupling comprising:

(a) a housing adapted to be secured to said aircraft;
(b) a probe telescopically mounted for limited slidable movement in said housing and adapted to receive said cable end fitting therein;
(c) securing means on said deck adapted to grasp said probe;
(d) means on said second cable for grasping said end fitting to draw said end fitting and said first cable secured thereto into said housing, said grasping means being adapted to be released when said end fitting is fully inserted in said housing, and (e) locking means in said housing adapted to secure said end fitting therein, said locking means being adapted to be actuated by said fitting.

8. In an apparatus for landing and securing aircraft of the rotor sustaining or hovering type on a ship's deck including a probe secured to said aircraft and a haul down cable for drawing said aircraft down to the deck; a carriage comprising:

(a) a frame secured to and movable on the deck;

(b) a pair of parallel rails mounted on said frame and adapted for slidable movement towards each other to secure said probe between said rails, said movement being effected by at least one cable secured to each said rail and a drum associated with each cable;

(c) locking means carried by one of said rails to cooperate with means on the other of said rails to lock said rails together;

(d) spring biased pins on at least one of said rails extending toward the other said rail, said pins being adapted to limit longitudinal movement of said probe with respect to said rail, and (e) means for selectively preventing movement of said rails, said means comprising an endless belt disposed transversely of said rails and entraining spaced apart pulleys, a block secured to said belt between said rails and adapted to be engaged by at least one of said rails, and friction braking means adapted to be applied to at least one of said pulleys.

9. In a device for landing and securing aircraft of the rotor sustaining or hovering type on the deck of a ship, including a probe secured to said aircraft, a winch adapted to be secured to said deck and a cable secured to said winch and adapted to be secured to said aircraft for pulling the aircraft down to said deck; a carriage adapted to be secured to but movable along said deck, said carriage comprising:

(a) a frame;

(b) a pair of parallel rails mounted on said frame and adapted to move slidably towards each other to receive said probe therebetween; and (c) means on at least one said rail to limit longitudinal movement of said probe with respect to said rails.

10. A device as claimed in claim 9 further comprising locking means carried by one of said rails and cooperating with means on said other rail to lock said rails together.

11. A device as claimed in claim 9 further comprising means for selectively preventing movement of said rails, said means comprising an endless belt disposed transversely of said rails and entraining spaced apart pulleys, a block secured to said belt between said rails adapted to be engaged by at least one of said rails, and friction braking means adapted to be applied to at least one of said pulleys.

12. A device as claimed in claim 9 further comprising at least one cable secured to each said rail and a drum associated with each cable, said cables being adapted to move said rails towards each other to secure said probe therebetween.

13. A carriage for transferring an object along a platform, said carriage comprising:

(a) a frame secured to and movable on the platform;

(b) a pair of parallel rails mounted on said frame and adapted for slidable movement towards each other to secure said object between said rails, said movement being effected by at least one cable secured to each said rail and a drum associated with each cable;

(c) locking means carried by one said rail to cooperate with means on said other rail to lock said rails together;

(d) spring biased pins on at least one said rail extending toward the other said rail, said pins being adapted to limit longitudinal movement of said object with respect to said rail, and (e) means for selectively preventing movement of said rails, said means comprising an endless belt disposed transversely of said rails and entraining spaced apart pulleys, a block secured to said belt between said rails and adapted to be engaged by at least one of said rails, and friction braking means adapted to be applied to at least one of said pulleys.

14. A device for landing and securing aircraft of the rotor sustaining or hovering type on a platform, said device comprising:

(a) a housing secured to said aircraft;

(b) a first cable extending through said housing and secured at one end to said aircraft;

(c) a second cable secured at one end to said platform;

(d) a coupling member formed on the free end of at least one of said cables and adapted to couple the free ends of said cables together;

(e) means on said aircraft for raising said first cable with respect to said aircraft so that said coupling member and said coupled ends extend into said housing;

(f) means in said housing for releasably securing said coupling member in said housing;

(g) means on said platform for extending and retracting said second cable;

(h) a probe disposed on said aircraft, and (i) means secured to said platform for grasping said probe.

References Cited by the Examiner

UNITED STATES PATENTS

| | | | |
|---|---|---|---|
| 1,972,863 | 8/1933 | Bolster | 244—116 |
| 2,415,071 | 2/1947 | Brie | 244—115 |
| 2,471,544 | 5/1949 | Ring | 244—115 |
| 3,151,826 | 10/1964 | Michel | 244—17.17 |

FOREIGN PATENTS

| | | |
|---|---|---|
| 1,086,563 | 8/1960 | Germany. |

MILTON BUCHLER, *Primary Examiner.*

T. MAJOR, *Assistant Examiner.*